(12) United States Patent
Bravi (10) Patent No.: US 11,201,674 B2
(45) Date of Patent: Dec. 14, 2021

(54) APPARATUS AND METHOD TO IMPROVE OPTICAL REACH IN BIDIRECTIONAL OPTICAL TRANSMISSION SYSTEMS EMPLOYING SINGLE-LASER COHERENT TRANSCEIVERS

(71) Applicant: Infinera Corporation, Annapolis Junction, MD (US)

(72) Inventor: Emilio Bravi, Hillsdale, NJ (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/230,600

(22) Filed: Dec. 21, 2018

(65) Prior Publication Data

US 2020/0204258 A1 Jun. 25, 2020

(51) Int. Cl.
| | | |
|---|---|---|
| *H04B 10/25* | (2013.01) | |
| *H04J 14/02* | (2006.01) | |
| *H04B 10/40* | (2013.01) | |
| *H04B 10/61* | (2013.01) | |
| *H04B 10/572* | (2013.01) | |
| *H04B 10/564* | (2013.01) | |
| *H04B 10/50* | (2013.01) | |

(52) U.S. Cl.
CPC ......... *H04B 10/2589* (2020.05); *H04B 10/40* (2013.01); *H04B 10/503* (2013.01); *H04B 10/564* (2013.01); *H04B 10/572* (2013.01); *H04B 10/61* (2013.01); *H04J 14/0227* (2013.01)

(58) Field of Classification Search
CPC .. H04B 10/2503; H04B 10/40; H04B 10/503; H04B 10/564; H04B 10/572; H04B 10/61; H04J 14/0227

USPC .......................................................... 398/79
See application file for complete search history.

(56) References Cited

U.S. PATENT DOCUMENTS

| | | | | |
|---|---|---|---|---|
| 2007/0154221 | A1* | 7/2007 | Mcnicol | H04J 14/0224 398/135 |
| 2012/0294614 | A1* | 11/2012 | Cvijetic | H04J 14/0282 398/67 |
| 2014/0226969 | A1* | 8/2014 | Patel | H04B 10/07955 398/20 |
| 2015/0171895 | A1* | 6/2015 | Pfau | H04L 1/0054 714/776 |
| 2016/0072586 | A1* | 3/2016 | Hochberg | H04B 10/64 398/136 |
| 2017/0012708 | A1* | 1/2017 | Saathoff | H04B 10/615 |
| 2017/0142504 | A1* | 5/2017 | Hochberg | H04J 14/06 |
| 2017/0268987 | A1* | 9/2017 | Swanson | A61B 5/0066 |

(Continued)

FOREIGN PATENT DOCUMENTS

FR 3460441 A1 * 9/2017 ............ G01M 11/00

*Primary Examiner* — Abbas H Alagheband
(74) *Attorney, Agent, or Firm* — Dunlap Codding PC; David L. Soltz (57) ABSTRACT

Optical networks, transponders and single-laser coherent transceiver are described. The single-laser coherent transceiver includes a wavelength source, a transmitter and a receiver. The wavelength source is tuned to supply a first optical signal having a first wavelength. The transmitter receives the first optical signal and encodes client data into the first optical signal to generate a second optical signal. The receiver receives the first optical signal from the wavelength source and a fraction of the second optical signal.

5 Claims, 4 Drawing Sheets

(56) References Cited

U.S. PATENT DOCUMENTS

| | | | |
|---|---|---|---|
| 2017/0346592 A1* | 11/2017 | Liu | G02B 6/4249 |
| 2017/0353265 A1* | 12/2017 | Mansouri Rad | H04B 10/2581 |
| 2018/0069633 A1* | 3/2018 | Onaka | H04B 10/43 |
| 2018/0198547 A1* | 7/2018 | Mehrvar | H04B 10/616 |
| 2019/0052392 A1* | 2/2019 | DeAndrea | H04J 14/0228 |
| 2019/0068286 A1* | 2/2019 | Saathoff | H04B 10/615 |
| 2019/0158182 A1* | 5/2019 | Jia | H04J 14/02 |
| 2019/0158211 A1* | 5/2019 | Furst | H04J 14/0294 |
| 2019/0181952 A1* | 6/2019 | Jia | H04B 10/2589 |

\* cited by examiner

APPARATUS AND METHOD TO IMPROVE OPTICAL REACH IN BIDIRECTIONAL OPTICAL TRANSMISSION SYSTEMS EMPLOYING SINGLE-LASER COHERENT TRANSCEIVERS

INCORPORATION BY REFERENCE

Not Applicable.

FIELD OF THE DISCLOSURE

The disclosure generally relates to methods and apparatuses for improving optical reach in bi-directional optical transmission systems employing single-laser coherent transceivers. More particularly the disclosure relates to methodologies employing a single-laser coherent transceiver having a transmitter and a receiver in which at least a portion of the optical power from an optical signal generated by the transmitter is supplied to the receiver when the transmitter is encoding client data into the optical signal.

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal), which may be collectively integrated onto a common semiconductor substrate.

A WDM system may also include a receiver circuit, such as a receiver (Rx) PIC, having a photodiode, and an optical demultiplexer circuit (referred to as a "demultiplexer") configured to receive the combined output and demultiplex the combined output into individual optical signals.

A WDM system may also include a set of nodes (e.g., devices of the WDM system that may be utilized to route the multiple optical signals, add another optical signal to the multiple optical signals, drop an optical signal from the multiple optical signals, or the like). During transmission of an optical signal in a WDM system, a set of intermediate nodes, such as a set of reconfigurable add-drop multiplexers (ROADMs), may be utilized to route and/or amplify the optical signal.

ROADMs are characterized by the number of fiber optic cables that the ROADMs can be connected to. Each fiber optic cable that a particular ROADM can be connected to is referred to in the art as a "degree". Thus, if a particular ROADM is configured to be connected to four fiber optical cables, then such ROADM is referred to in the art as having four degrees. For each degree, the ROADM has an optical device known as a wavelength selective switch connected to the fiber optic cable. The degrees have been named in the direction that the optical signal is transmitted, such as East, West, North or South. The wavelength selective switch has a plurality of input ports, and functions to combine and shape the spectrum of light received at the input ports into a single combined signal that is passed onto the fiber optic cable. Shaping the light received at the plurality of input ports includes blocking optical signals having undesired wavelengths of light received at the input ports so that the single combined signal does not include the blocked optical signals. To block the undesired optical signals, each of the input ports of the wavelength selective switch includes a separate reconfigurable filter.

In networks that use a single optical fiber for bi-directional communication, i.e., for East-West and West-East optical transmission, coherent transceivers are used to transmit and receive the optical transmissions. The coherent transceivers need to have a laser for the transmitter and a laser for the receiver. The laser at the receiver must be tuned to the same wavelength received. In dual-laser transceivers each laser can be independently tuned to a certain wavelength, enabling the transmitter and the receiver to work with different wavelengths. In single-wavelength transceivers, only one laser is shared between transmitter and receiver, forcing this kind of transceivers to use the same wavelength for the transmitter and for the receiver.

Single wavelength coherent transceivers have a transmitter, a receiver, and a test mode in which a portion of the optical power of an optical signal generated by the transmitter is provided to the receiver. Such optical signal is not encoded with client data when the test mode is enabled.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

The disclosure applies to networks that use a single fiber for both East-West and West-East optical transmission (bidirectional links).

Usually, the coherent transceivers used in bidirectional links have the capacity to transmit at a certain wavelength $\lambda_T$ and to receive at a different wavelength $\lambda_R$ (dual-laser transceivers). The reason for having different wavelengths, is to avoid coherent crosstalk caused by wavelength reflections in optical fiber. In fact, because of imperfections in the optical fibers, certain amount of light is reflected back in the opposite direction. If the wavelength used in both directions is the same (as in single-laser transceivers), the reflection from a wavelength going in one direction interferes with the wavelength travelling in the opposite direction, causing a significant limitation in the optical reach. Conversely, if the wavelengths used are different, then the reflection will not cause interference.

This disclosure teaches the skilled artisan how to employ single-laser coherent transceivers (same wavelength for transmission and reception) in bidirectional optical links, without incurring the reduced optical reach caused by interference within the optical links. The methodologies employed herein allow a combination of single-laser coherent transceivers to achieve the same optical reach that is presently achievable with dual-laser coherent transceivers.

Description

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
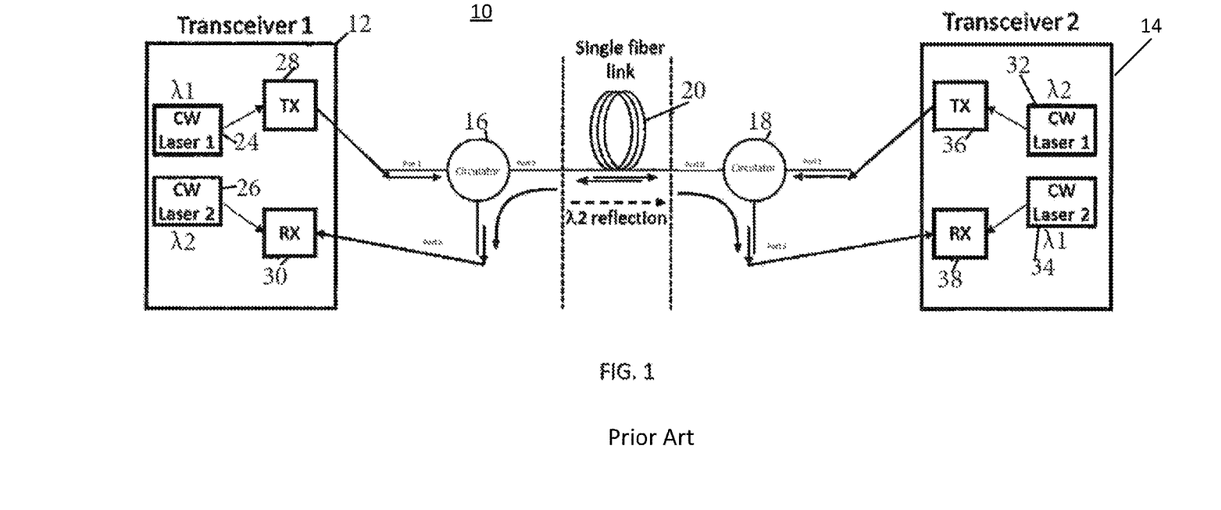
FIG. 1 illustrates a prior art optical communication system having dual-laser coherent transceivers bi-directionally communicating via a single optical fiber.

A prior art optical communication system 10 is shown in FIG. 1. As shown, optical communication system 10 comprises a first dual laser coherent transceiver 12, a second dual laser coherent transceiver 14, a first circulator, a second circulator 18, and a single fiber optical link 20 extending between the first circulator 16 and the second circulator 18. The first dual laser coherent transceiver 12 includes a first continuous wave laser 24, a second continuous wave laser 26, a first transmitter 28 and a first receiver 30. The second dual laser coherent transceiver 14 includes a third continuous wave laser 32, a fourth continuous wave laser 34, a second transmitter 36 and a second receiver 38.

The first continuous wave laser 24 and the fourth continuous wave laser 34 are both tuned to a first wavelength. The second continuous wave laser 26 and the third continuous wave laser 32 are both tuned to a second wavelength. In use, during a first period of time, the first continuous wave laser 24 supplies an optical signal to the first transmitter 28 which encodes data into the optical signal and then supplies the encoded optical signal to the first circulator 16. The first circulator 16 passes the encoded optical signal having the first wavelength onto the single fiber optical link 20, which passes the encoded optical signal to the second circulator 18. The second circulator 18 passes the encoded optical signal to the second receiver 38, which decodes the data from the encoded optical signal.

During the first period of time, the third continuous wave laser 32 supplies an optical signal having the second wavelength to the second transmitter 36 which encodes data into the optical signal and then supplies the encoded optical signal to the second circulator 18. The second circulator 18 passes the encoded optical signal having the second wavelength onto the single fiber optical link 20, which passes the encoded optical signal to the first circulator 16. The first circulator 16 passes the encoded optical signal to the first receiver 30, which decodes the data from the encoded optical signal.

Due to the use of the first and second wavelengths, the prior art optical communication system 10 avoids reflection penalties while the encoded optical signals pass through the single fiber optical link 20.

Figure 2:
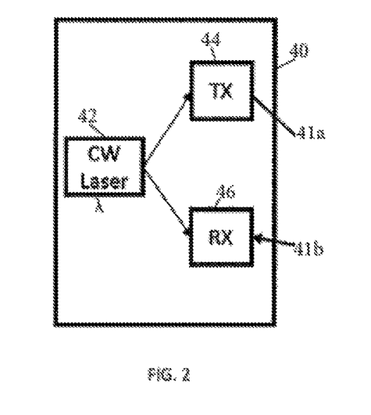
FIG. 2 illustrates a single laser coherent transceiver that is used in accordance with the present disclosure to bi-directionally communicate via a single optical fiber.

Shown in FIG. 2 is a single laser coherent transceiver 40 that is used in accordance with the present disclosure. The single laser coherent transceiver 40 supplies optical signals onto an optical fiber 41*a*, and receives optical signals on an optical fiber 41*b*. The single laser coherent transceiver 40 includes a continuous wave laser 42 supplying optical signals to both a transmitter 44 and a receiver 46. The optical signal generated by the continuous wave laser 42 forms a local oscillator for the receiver 46 to assist the receiver 46 in decoding optical signals having the same wavelength as the optical signals generated by the continuous wave laser 42.

Figure 2B:
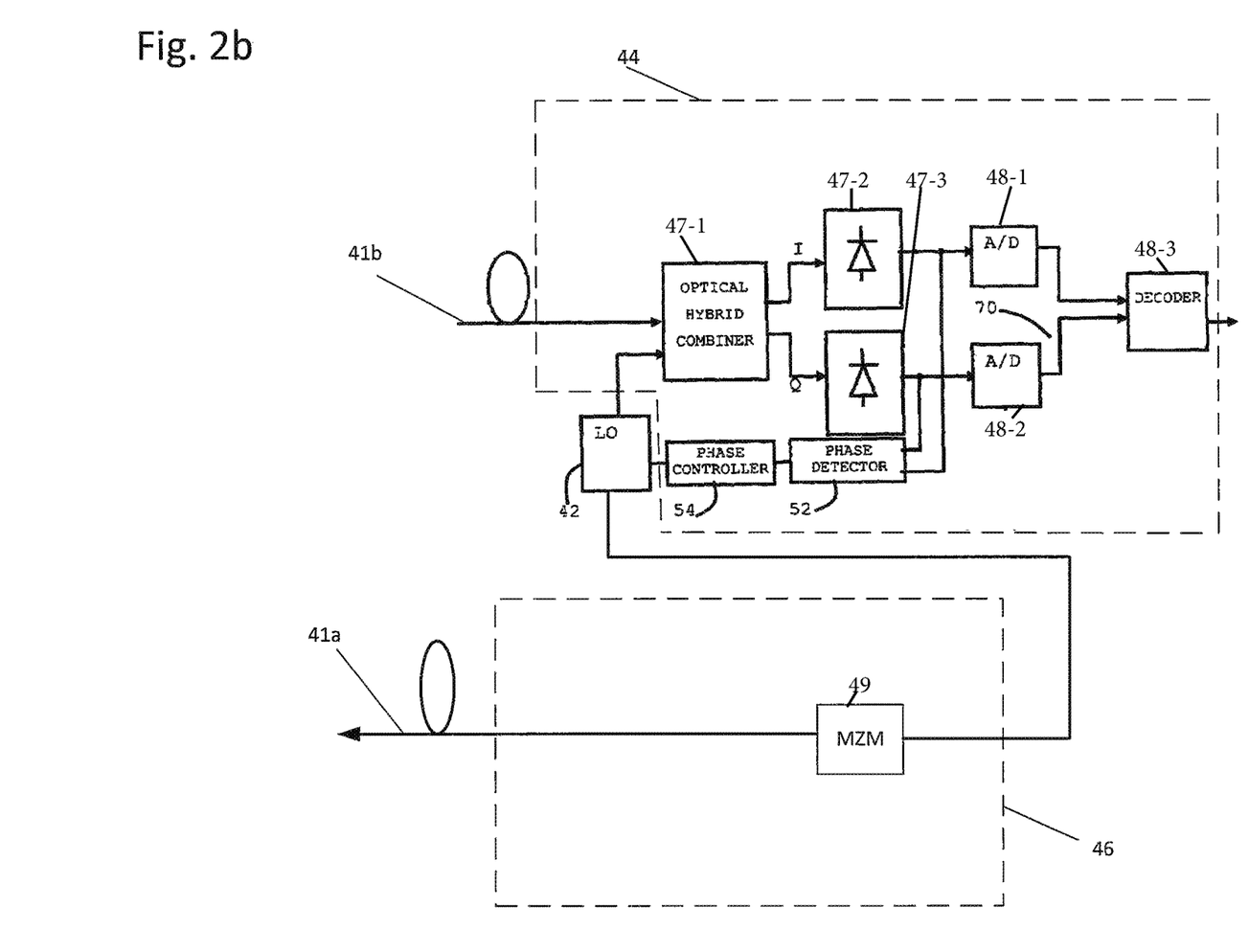
FIG. 2b is a block diagram showing transmitter and receiver components of the single laser coherent transceiver of FIG. 2 in more detail.

FIG. 2*b* shows transmitter 44 and receiver 46 components in greater detail. Receiver 44 receives incoming optical signals from optical fiber 41*b*, as well as light from laser 42, which may constitute a local oscillator laser. Light from laser 42 and the incoming optical signals may be provided to optical hybrid circuit 47-1, which outputs, from the input optical signal, the in-phase (I) and quadrature (Q) components of the received signal. Signal amplitudes of the I and Q components are obtained by opto-electric conversion with photodiode-based receivers 47-2 and 47-3, each of which may include balanced photodiodes. The outputs of the photodiode-based receivers 47-2 and 47-3 are in analog form but are next supplied to analog to digital (A/D) converters 48-1 to 48-2, which, in turn, provide corresponding digital outputs. A/D converters 48-1 to 48-2 may operate at the signaling rate of the communications system, such as 100 Gbaud/s. The digitised outputs may then be provided to a decoder 48-3 or other digital signal processing for carrier recovery and/or demodulation.

In order to properly detect the incoming signals, the wavelength of the LO light is the same or nearly the same as the wavelength of the incoming or received optical signals.

As further shown in FIG. 2*b*, light from laser 42 may also be provided to a Mach-Zehnder modulator 49 in transmitter 46. Such light may be provided from a side of laser 42 opposite the side that outputs the local oscillator light. Alternatively, a splitter or coupler may be provided (not shown) that receives light from one side of laser 42 and provides a first portion of the light as the LO light to the receiver 44 and a second portion of the light to transmitter 46 for modulation by Mach-Zehnder modulator (MZM) 49 and transmission on fiber 41*a*. In one example, the MZM 49 may include a pair of Mach-Zehnder modulators to generate in-phase and quadrature components, which may be combined to provide the transmitted signal. Since laser 42 is also used to provide LO light, the wavelength of the optical signals transmitted by transmitter 44 is the same or nearly the same as the wavelength of the received optical signal.

In a further example, the optical signals received on optical fiber 41b may be polarization multiplexed, and the optical signals output onto optical fiber 41a may also be polarization multiplexed. In that case, a suitable polarization beam combiner and polarization beam splitter circuitry may be provided in the transmitter 46 and receiver 44, respectively. Additional optical and electrical circuitry may be provided in the transmitter 44 and receiver 46 to modulate and demodulate/decode the data carried by the signals in each polarization.

Figure 3:
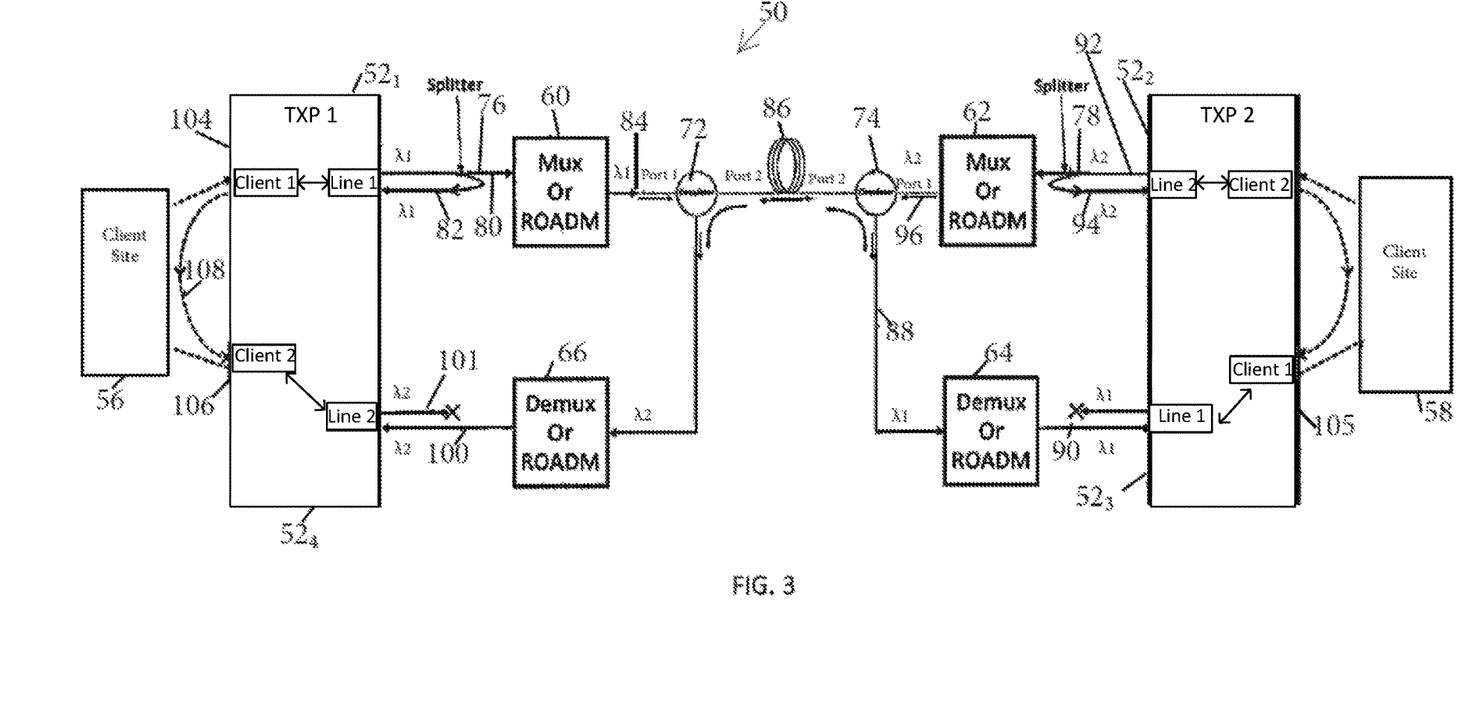
FIG. 3 illustrates an optical communication system constructed in accordance with the present disclosure that includes four single wavelength coherent transceivers forming a bi-directional communication link over a single optical fiber.

FIG. 3 illustrates an optical communication system 50 constructed in accordance with the present disclosure that includes four single wavelength coherent transceivers $52_{1-4}$ forming a bi-directional communication link over a single optical fiber 54 between a first client site 56 and a second client site 58. As will be understood by one skilled in the art, the first client site 56 and the second client site 58 include telecommunication equipment that is configured to supply and receive data to be communicated by the transceivers $52_{1-4}$. For example, the first client site 56 and the second client site 58 may be provided with a router.

The coherent transceivers $52_1$ and $52_4$ are components of a first transponder TXP1, and the coherent transceivers $52_2$ and $52_3$ are components of a second transponder TXP2. The method is described by way of example using the two transponders, TXP1 and TXP2, each of which has 2 client ports and 2 coherent transceivers 52. However, this method can be used with transponders that have at least two client ports and at least two transceivers 52.

The coherent transceivers $52_{1-4}$ can be constructed using any appropriate hardware configuration. For example, the coherent transceivers $52_{1-4}$ may conform to the requirements known in the art as: optical internetworking forum (OIF), 5×7, C form factor pluggable 1, C form factor pluggable 2, C form factor pluggable 4, C form factor pluggable 8, Quad Small Form Factor Pluggable 56-DD, Quad Small Form Factor Pluggable 28, Quad Small Form Factor Pluggable+, Small Form Factor Pluggable, Small Form Factor Pluggable+, and the like.

The coherent transceivers $52_{1-4}$ are paired in such a way that that each of the coherent transceivers $52_{1-4}$ is working as a transmitter only or as a receiver only.

In this way, the TXP1-TXP2 transmission takes place on a first wavelength and the TXP2-TXP1 transmission takes place on a second wavelength that is different from and spaced spectrally from the first wavelength. Therefore, it is possible to support bidirectional links without reach penalties due to reflection, even though the coherent transceivers $52_{1-4}$ are single-laser transceivers.

As shown in FIG. 3, the optical communication system 50 is provided with the transponders TXP1 and TXP2, a plurality of multiplexers 60 and 62, a plurality of demultiplexers 64, and 68, a first optical director 72, a second optical director 74, a first splitter 76, a second splitter 78, and optical fibers 80, 82, 84, 86, 88, 90, 92, 94, 96, 98, 100 and 101. The multiplexers 60 and 62, and demultiplexers 64 and 68 may be implemented as a reconfigurable optical add drop multiplexer (ROADM) that may regenerate and/or amplify the optical signals. The first and second optical directors 72 and 74 can be circulators, interleavers, or other devices capable of directing light having certain wavelengths to predetermined ports. Further, it should be understood that the first optical director 72 may be constructed in a different manner as compared to the second optical director 74. As shown in FIG. 3, the transmission from TXP1 to TXP2 works as follows.

The transponder TXP1 receives client data on a first client port 104 from the client site 56. The client data can be in an optical or electronic form. In either case, the client data is provided to the coherent transceiver $52_1$ having the transmitter 44 encoding the data into an optical signal having a first wavelength, and supplies the optical signal onto the optical fiber 80. Before entering the multiplexer 60, the first splitter 76 sends back a fraction of the first wavelength to the receiver 46 of the coherent transceiver $52_1$ via the optical fiber 82. The fraction of the first wavelength may be 5% or 10%, for example. Stated another way, the first splitter 76 may be a 90:10 or a 95:5 splitter which passes either 90-95% of the optical signal, and returns 5 or 10%, for example, to the receiver 46 of the coherent transceiver $52_1$. The first splitter 76 and the optical fiber 82 can be referred to herein as having a "loopback configuration." By supplying a fraction of the first wavelength to the receiver 46 of the coherent transceiver $52_1$, the coherent transceiver $52_1$ will not trigger any alarm (e.g., optical loss of signal or the like) due to receiving a valid signal. The data received by the receiver 46 of the coherent transceiver $52_1$ can be discarded.

The fraction of the optical signal that passes the splitter on optical fiber 80 is supplied to the receiver 46 of the coherent transceiver $52_3$ as described below. The optical signal is received by the multiplexer 60, and then passed to the first optical director 72 via the optical fiber. The first optical director 72 passes the optical signal to the optical fiber 86, which supplies the optical signal to the second director 74. The second optical director 74 directs the optical signal to a port connected to the optical fiber 88, which passes the optical signal to the demultiplexer 64 and the receiver 46 of the coherent transceiver $52_3$ via the optical fiber 90. The coherent transceiver $52_3$ decodes the data carried by the optical signal, and supplies the data to a client port 105, which forwards the data to the second client site 58.

The first client port 104 transmits the data to a second client port 106 as shown by a dashed line 108. The second client port 106 provides the data to the transmitter 44 of the coherent transceiver $52_4$, which encodes the data in an optical signal having a second wavelength that is transmitted onto the optical fiber 101. In this way the second client port 106 and coherent transceiver $52_4$ will not trigger any alarm, due to receiving a valid signal. The optical signal from the transmitter 44 of the coherent transceiver $52_4$ is not used and can be either blocked by a ROADM or simply by not connecting the optical fiber 101 to a multiplexer.

The transmission of client data from the second client site 58 to the first client site 56 using the transponder TXP2 to communicate with the transponder TXP1 works in an identical way.

This configuration allows the optical communication system 50 to have all the line coherent transceivers $52_{1-4}$ and all the client transceivers 104-106 working in normal operation and achieve an optical reach similar to using dual laser coherent transceivers. Therefore, this configuration achieves bidirectional transmission on a single optical fiber 86 using single-laser coherent transceivers $52_{1-4}$.

Typically, bidirectional transmission using the single optical fiber 86 is more commonly found in access and metro networks, where employing a second fiber to implement unidirectional transmission is not economically convenient for the level of capacity carried in these networks. The optical communication system 50 of the present disclosure, when applied to a point-to-point link as in FIG. 3, results in utilizing only 50% of the capacity of the transponders TXP1 and TXP2, but this limitation is usually less expensive than utilizing a second fiber.

Figure 4:
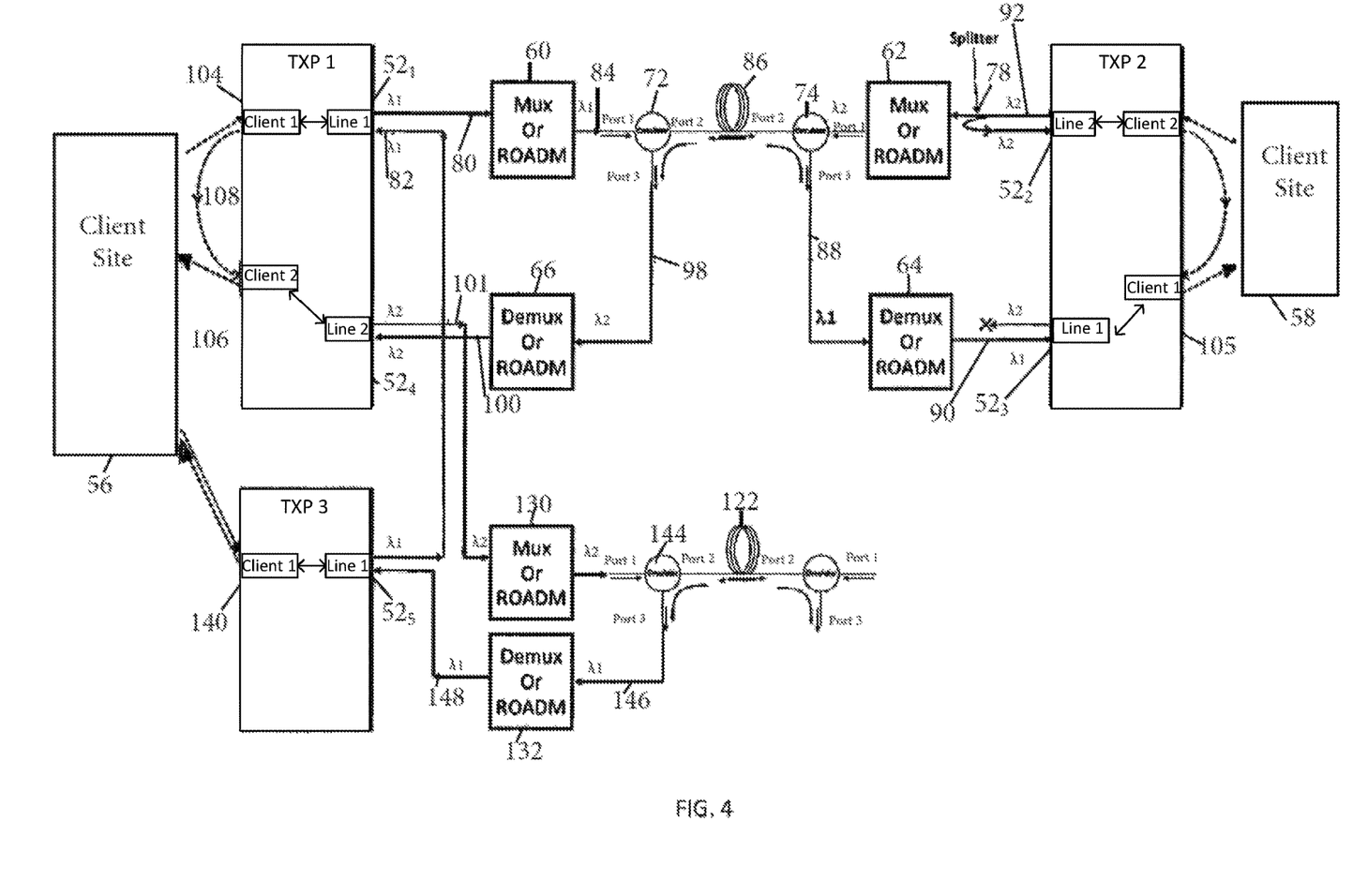
FIG. 4 illustrates another version of an optical communication system constructed in accordance with the present disclosure that includes five single wavelength coherent transceivers to bi-directionally communicate over two separate optical fibers.

FIG. 4 illustrates another version of an optical communication system 120 constructed in accordance with the present disclosure that includes five single wavelength coherent transceivers $52_{1-5}$ to bi-directionally communicate over two separate optical fibers 86 and 122. For purposes of brevity, similar components within the optical communication system 120 and the optical communication system 50 include similar reference numerals and only the differences between the optical communication system 120 and the optical communication system 50 will be described.

As will be described below, the optical communication system 120 includes an overall transponder utilization rate that is higher than the transponder utilization rate of the optical communication system 50.

This accomplished by connecting the transmitter 46 of the single wavelength coherent transceivers $52_5$ to the receiver 44 of the single wavelength coherent transceivers $52_1$ via the optical fiber 82; the transmitter 46 of the single wavelength coherent transceivers $52_4$ to a mux or ROADM 130 via the optical fiber 101; and the receiver 44 of the single wavelength coherent transceivers $52_5$ to a demux or ROADM 132 via an optical fiber 134. Within the optical communication system 120, communications between the first client site 56 and the second client site 58 occur as described above with respect to FIG. 3. Further, data to be communicated from the client site 56 to a client site other than the second client site 58 are transmitted from the client site 56 to a third client port 140. The third client port 140 receives the data and supplies the data to the single wavelength coherent transceiver $52_5$. The transmitter 46 of the single wavelength coherent transceiver $52_5$ encodes the data into an optical signal having the first wavelength, and transmits the optical signal to the receiver 44 of the single wavelength coherent transceiver $52_1$. The receiver 44 of the single wavelength coherent transceiver $52_1$ decodes the data, and supplies the data to the first client port 104, which supplies the data to the transmitter 46 of the single wavelength coherent transceiver $52_4$ via the second client port 106. In one embodiment, the single wavelength coherent transceivers $52_1$, $52_4$, and $52_5$ can be located in close proximity, at a single site. In this embodiment, the optical fiber 82 can be a patch cable. The transmitter 46 of the single wavelength coherent transceiver $52_4$ encodes the data into an optical signal having the second wavelength, and supplies the optical signal to the optical fiber 122 via the optical fiber 101, the mux or ROADM 130, and a signal director 144. The signal director 133 also receives optical signals having the first wavelength from the optical fiber 122, and directs the optical signals to the demux or ROADM 132 via an optical fiber 146, and the demux or ROADM 132 supplies the optical signals having the first wavelength to receiver 44 of the single wavelength coherent transceiver $52_5$ via an optical fiber 148.

In multi-degree nodes, for example, the optical communication system 120 leads to an overall transponder utilization higher than 50%. This is illustrated in the example in FIG. 4 where Transponder 3 (TXP 3), transmitting on the optical fiber 82 via the first wavelength, can "convert" the first wavelength to the second wavelength (from λ1 to λ2) by passing the data through the receiver 44 of the single wavelength coherent transceiver $52_1$, the first client port 104, the second client port 106, and the transmitter 46 of the single wavelength coherent transceiver $52_4$. The wavelength λ1 from TXP3 is received by TXP1 Line 1 and "looped back" on TXP1 line 2 over wavelength λ2 which is then transmitted on the optical fiber 122. In this case TXP1 is utilized at 50% of capacity and TXP3 is utilized at 100% capacity for an overall transponder utilization higher than 50%.

Conclusion

Usually, the coherent transceivers used in bidirectional links have the capacity to transmit at a certain wavelength $\lambda_T$ and to receive at a different wavelength $\lambda_R$ (dual-laser transceivers). The reason for having different wavelengths, is to avoid coherent crosstalk caused by wavelength reflections in optical fiber. In fact, because of imperfections in the optical fibers, certain amount of light is reflected back in the opposite direction. If the wavelength used in both directions is the same (as in single-laser transceivers), the reflection from a wavelength going in one direction interferes with the wavelength travelling in the opposite direction, causing a significant limitation in the optical reach. Conversely, if the wavelengths used are different, then the reflection will not cause interference.

This disclosure teaches the skilled artisan how to employ single-laser coherent transceivers (same wavelength for transmission and reception) in bidirectional optical links, without incurring the reduced optical reach caused by interference within the optical links. The methodologies employed herein allow a combination of single-laser coherent transceivers to achieve the same optical reach that is presently achievable with dual-laser coherent transceivers.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A transponder, comprising:
    a first coherent transceiver having a first laser tuned to supply a first light having a first wavelength, a first modulator receiving a first portion of the first light and encoding client data into the first portion of the first light to generate a first modulated optical signal, which is supplied to a first optical fiber, and a first receiver including an optical hybrid circuit, the optical hybrid circuit receiving a second portion of the first light from the first laser and a fraction of the first modulated optical signal reflected back to the first optical transceiver along the first optical fiber; and
    a second coherent transceiver having a second laser tuned to supply a second light having a second wavelength spectrally spaced from the first wavelength, a second modulator receiving a first portion of the second light and encoding the client data into the second light to generate a second modulated optical signal, which is supplied to a port that is disconnected from a second optical fiber, and a second receiver receiving a second portion of the second light and a third optical signal having the second wavelength.

2. The transponder of claim 1, further comprising a first client port and a second client port, the first client port supplying the client data to the first transmitter, and to the second client port, the second client port supplying the client data to the second transmitter.

3. The transponder of claim 1, wherein the fraction of the first modulated optical signal is less than 10% of an optical power of a second optical signal.

4. The transponder of claim 1, further comprising a splitter having a first port receiving a second optical signal, and a second port supplying the fraction of the first modulated optical signal to the first receiver.

5. The transponder of claim 1, wherein the first receiver is configured to decode the client data in the first modulated optical signal, and wherein the first receiver is configured to discard the client data.

* * * * *